April 1, 1930. C. R. BORLAND 1,752,881
MANUFACTURE OF SMOKELESS POWDER
Filed March 1, 1924
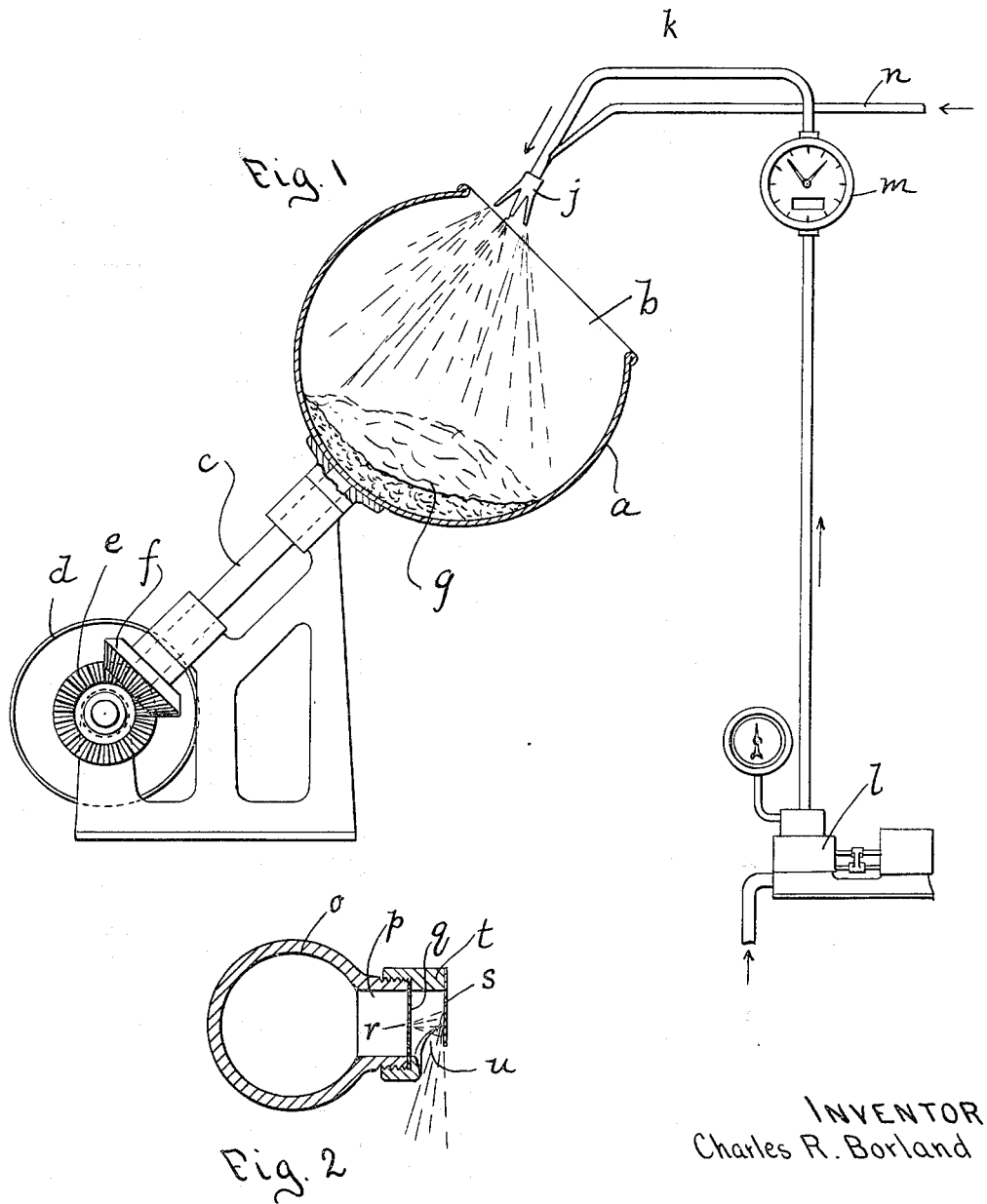
INVENTOR
Charles R. Borland
by Wright, Brown, Quimby & Hay
att'ys Patented Apr. 1, 1930

1,752,881

UNITED STATES PATENT OFFICE

CHARLES R. BORLAND, OF CONCORD, MASSACHUSETTS, ASSIGNOR, BY MESNE ASSIGNMENTS, TO AMERICAN POWDER COMPANY, OF BOSTON, MASSACHUSETTS, A CORPORATION OF MASSACHUSETTS

MANUFACTURE OF SMOKELESS POWDER

Application filed March 1, 1924. Serial No. 696,202.

The present invention relates to smokeless powder and particularly that made for small arms, shot-guns, and the like, which is produced in the form of small grains or pellets. More especially the invention is concerned with methods of hardening, by partially gelatinizing, grains of nitrated cotton in order to control the rate of burning of the smokeless powder made of such grains. It consists in a new method of treating the grains of nitro-cotton by which the degree of gelatinizing or hardening the grains may be more exactly and accurately controlled than heretofore, and by which a more uniform treatment of all the grains is accomplished, and economies in the expenditure of solvents are effected.

It will be helpful to a clear and exact explanation of my invention to refer briefly to the methods heretofore employed in producing smokeless powder of the sort above referred to. Powder of this character is known commercially by the trade names or symbols "E. C." "Schultze" and "Dead Shot." In making it, the nitrated cotton, consisting of short fibres, is agitated in tumbling drums until the mass of fibres forms itself into compact separate grains which are sufficiently coherent to maintain their form in the handling and screening steps which are next carried out to segregate grains of different sizes from one another. Then, after screening, the grains are treated by moistening with solvents. Heretofore such solvents have been applied either by hand or by a system of pipes and sprinkler heads, in the form of a spray, or rather streams, comparable to the streams delivered by ordinary watering pots for garden use. After being thus moistened the powder is tumbled in closed drums with external application of heat, and the solvent is disseminated through the mass of grains as far as it can be by permeation of the vapor of the solvent through the mass and by contact of the grains which have absorbed less of the solvent with those which have received more of it. However, at the best, with this method there is not a complete and uniform moistening of the powder grains with solvent but some of them receive too much of it, while others receive too little. Those that receive too little are not sufficiently gelatinized and hardened, while those that receive too much are dissolved in too great a degree, become sticky and are liable to adhere to other grains.

There are a number of other objections to the old method above described, besides the impossibility of evenly applying the solvent already mentioned. One is the impossibility of using a solvent of exactly the right degree of activity. This difficulty is a corollary of that previously mentioned and is due to the fact that if a highly active solvent is used, designed to effect the desired degree of hardening of those grains which receive the least of it, the ones which unavoidably receive an excess of the solvent stick together and form large lumps. On the other hand if a solvent of such low activity is used that none of the grains will be dissolved enough to lump together, the major part of the grains will not be hardened enough, and the material may have to be reworked.

A further objection is the loss of economy which also results due to the necessity of combining solvents which mix together with difficulty and some of which are expensive, in the effort to furnish a solvent mixture which will obtain in the most nearly uniform possible degree permeation of all the grains without too greatly dissolving any of the grains.

Finally the greatest objection is the lack of uniformity of the product, because at the best the grains are not uniformly and evenly affected by the solvent, and the powder does not burn evenly, and thus is not all that could be desired in ignition for all purposes.

The improvements which constitute this invention overcome the objections inherent in the old process.

They consist first in the applying the solvent to the previously manufactured, dried, granulated, and screened powder in such a way, and accompanied with such motion of the powder grains, that substantially uniform treatment of all the grains by the solvent is obtained; and second in subdividing the solvent into such minute particles before application to the powder, while maintaining the solvent in the liquid state as distinguished from the condition of a vapor, that no single particle of the solvent is able to satisfy the absorptive capacity of any single grain of powder.

I will now describe the invention more in detail in connection with a drawing which shows diagrammatically a form of apparatus suitable to be used in performing the process.

In this drawing Figure 1 is a diagram of the apparatus referred to illustrating the principles involved therein.

Fig. 2 is a detail sectional view showing a form of atomizing device capable of breaking up liquid into particles minute enough for the purpose of this invention, by the imposition of pressure alone on the liquid.

The motion of the powder necessary to shift the grains so that all may receive substantially equal quantities of the solvent may be effected by placing the powder in a rotating pan or drum which turns about an axis so related to the horizontal that the traveling walls of the drum constantly raise the mass of powder and cause the grains on the surface of the mass to continually flow in the manner of an avalanche, while atomized or pulverized solvent is directed into the open drum or pan. Thus the grains within the mass of powder are continually uncovered by falling away of the outermost grains until all are eventually exposed on the surface of the mass one or more times, the number of exposures being determined by the length of time the pan is rotated.

In the drawing $a$ represents a suitable pan for this purpose, the same being of spherical form with an open mouth $b$ and mounted on an inclined shaft $c$ which is driven rotatably by any suitable mechanism typified by a belt pulley $d$ and bevel gears $e$ and $f$. $g$ represents the powder in the pan. The relatively small mass of powder here shown may be considered as a minimum charge, and it will be understood that much larger quantities than that shown may be treated in a single charge. As the pan rotates about an inclined axis, the mass of powder is carried upward by the rising wall until gravity causes the outermost grains to roll to the bottom of the mass. This action is continuous, the surface grains continually rolling to the bottom, uncovering those beneath, and being buried by following grains, until substantially all of the grains are eventually uncovered, several times if need be, provided pan is kept in motion long enough.

A spray of very finely divided particles of solvent is continuously directed into the open mouth of the pan while the tumbling action of the powder grains continues. For delivering this spray I have shown an atomizer head $j$ supplied with liquid solvent by a pipe $k$. I have also shown a pump $l$ for taking the solvent from a source of supply and feeding it to the spray head through a meter $m$ which measures the volume of the solvent so delivered. $n$ represents a pipe through which compressed air, or, it may be an inert gas, is caused to flow to the spray head for the purpose of pulverizing the liquid solvent. I have not shown in detail the construction of pulverizing or atomizing means, for I may use any of the devices already known and used in other relations by which a current of air is caused to break up a stream of liquid into fine particles.

However, I am not dependent upon the use of air or other gas for breaking up the liquid as indicated, but I may use mechanical means for getting the same result.

Figure 2 shows a type of atomizer effective under the influence of pressure alone in the liquid. Here $o$ represents a pipe or spray head full of liquid under the pressure imposed by the pump $l$ or other means, from which opens a branch $p$. Across the branch $p$ is placed a partition or rigid diphragm $q$ having a small hole $r$, and across the path of the stream or jet of liquid which issues under pressure from the hole $r$ is placed a baffle $s$. This baffle is shown as supported by a ring $t$ screwed on the outlet branch $p$ and constructed also to secure the partition $q$ in place. The jet of liquid issuing from the hole $r$ and striking the baffle forcibly is broken into minute particles which escape through an opening $u$ formed in the ring. Such a spray device, or a number of them, may be used in place of the spray head shown at $j$ in Figure 1, but unconnected with the air pipe $n$, which may be omitted when the spray device of Fig. 2 is used.

I prefer in commercial practice to effect atomization of the solvent by mechanical means rather than by the action of an air stream, for mechanical action avoids the evaporation and loss of solvent incidental to atomization by air.

Regardless of the precise way in which the liquid is pulverized, the essential fact is that it is subdivided into particles smaller than the powder grains, whereby although the particles of the solvent may fall directly upon the powder grains, no one of them contains a sufficient volume of liquid to satisfy the grain on which it falls. In other words the quantity of solvent necessary to dissolve any individual powder grain, or even to bring it to that state of partial solution in which it is jelly-like and liable to coalesce with other grains, is much greater than the volume of any single particle of the atomized solvent.

In this respect the present method differs substantially and radically from the prior commercial methods of hardening smokeless powder, for in those methods the solvent is delivered in streams or drops of volume more than sufficient to saturate single powder grains with which the liquid may come into direct contact. In the practice of my method the continual shifting of the powder grains exposes each individual grain to the spray of solvent for only a limited time, and the rate of delivery of the solvent and the rate of shifting of the grains may be so exactly regulated that during this time it would be impossible for any grain to receive more than enough of the solvent to satisfy its requirements for the particular degree of hardening desired. The ultimate result of supplying enough solvent to the grains may be effected either by delivering a relatively large quantity of solvent in proportion to the rate of shifting of the grains during a relatively short period of tumbling action, or by delivering a relatively small quantity of solvent and continuing the tumbling action until the same grains have been exposed on the surface of the mass several times. In any case, however, the length of time that individual grains are thus exposed is limited, and practically all of the grains are equally exposed.

It follows then that the powder is treated with substantial uniformity as to all of the grains, and that the treatment can be continued as long as desired and stopped at any point, whereby the degree to which the powder grains are affected by the solvent may be exactly regulated. In other words the powder may be hardened as much or as little as desired and its density can thus be regulated. For instance I can easily produce at will powder of any density between 33 grains and 55 grains for each three drams of the powder. In giving this example I do not intend to indicate the limits of the results which may be accomplished, but simply to indicate the wide range of such results which is made possible for the first time with exactness by this invention.

Further, the process allows of any solvent being used, and particularly makes it possible to select that solvent which is most effective for any particular grade of powder or quality of raw material; and it is one which enables the solvent to be used with the greatest economy, because little or no excess need be supplied in order to insure an adequate degree of hardening of all the grains.

It will be understood that I am not restricted to any specific type or construction of pan or drum for tumbling the powder grains while applying solvent to them. While the type of pan here shown may be preferable to others on some accounts, it is here shown simply as an illustration of means suitable for the purpose, and may stand generically for any sort of a container, however constructed and arranged, capable of moving powder grains in the manner previously indicated and having an opening through which the solvent may be admitted substantially as set forth. The operation of applying solvent to the powder may be carried out at the room temperature or with application of heat or at artificially reduced temperature, according to circumstances.

After the powder has been treated with solvent, it is dried, with or without recovery of the solvent vapors given off in drying; but the steps of drying and solvent recovery may be carried out as heretofore or in any other suitable way. My present invention is not concerned in any way with such steps or process, except as said further steps are required to complete the hardening process, by drying the grains which have been transformed to a greater or less degree into the gelatinous condition by solvent applied in the novel manner hereinbefore described.

What I claim and desire to secure by Letters Patent is:

1. The method of treating grains of nitrated cotton to produce smokeless powder which consists in applying to the outer layer of a collection of such grains liquid solvent in such finely divided state that the separate particles of the solvent contain less than sufficient solvent to satisfy any single grain, and continuously changing the individual grains composing such outer layer.

2. The method of hardening nitrated cotton in granular form to make smokeless powder, which consists in delivering into an enclosed space containing a mass of the granular material, and above such mass, a liquid solvent in a spray of such fine subdivision that the separate particles thereof are of substantially less volume than the single grains of the material, and continuously removing the grains on the exposed surface of such mass.

3. The method of hardening nitrated cotton in granular form to make smokeless powder, which consists in delivering over the exposed upper surface of a mass of the granular material, a liquid solvent in a state of such fine subdivision that the separate particles thereof are of substantially less volume than the single grains of the material, and at the same time shifting the granular mass in such manner as to uncover successively the grains below the previously exposed surface of such mass.

4. The method of hardening nitrated cotton in granular form to make smokeless powder, which consists in delivering into an enclosed space containing a mass of the granular material, and over the exposed upper surface of such mass, a liquid solvent in a state of such fine subdivision that the separate particles thereof are of substantially less volume than the single grains of the material, and at the same time shifting the granular mass in such manner as to uncover successively the grains below the exposed surface of such mass and continuing the progressive exposure and re-exposure of the grains of the mass to the solvent for a long enough time to effect absorption of the solvent to the desired degree by the powder grains.

5. The method of treating ungelatinized grains of nitrocellulose to harden them which consists in tumbling a mass of such grains in a rotating container in such manner that the outermost grains continually flow down the surface of the mass leaving exposed the grains beneath them, and at the same time directing toward the exposed surface of the mass a spray of solvent in such finely divided state that the quantity of liquid in any particle of the spray is insufficient to dissolve any single grain.

6. The method of treating ungelatinized grains of nitrocellulose to harden them which consists in tumbling a mass of such grains in a rotating container in such manner that the outermost grains continually flow down the surface of the mass leaving exposed the grains beneath them, and at the same time directing toward the exposed surface of the mass a spray of solvent in such finely divided state that the quantity of liquid in any particle of the spray is insufficient to dissolve any single grain so far as to cause lumping together of the grains.

7. The method of hardening nitrocellulose to make smokeless powder which consists in exposing a mass of nitrocotton in granular form to an atmosphere containing a spray of a solvent of nitrocellulose, and in simultaneously shifting such mass progressively so as to expose grains beneath the surface of such mass and cover the grains previously on the surface of the mass.

In testimony whereof I have affixed my signature.

CHARLES R. BORLAND.